（12) United States Patent
Aruga (10) Patent No.: US 7,185,207 B2
(45) Date of Patent: Feb. 27, 2007

(54) PORTABLE TERMINAL APPARATUS WITH SECURITY FUNCTION

(75) Inventor: Toshihiro Aruga, Tokyo (JP)

(73) Assignee: NEC Corporation, Tokyo (JP)

( * ) Notice: Subject to any disclaimer, the term of this patent is extended or adjusted under 35 U.S.C. 154(b) by 749 days.

(21) Appl. No.: 09/810,220

(22) Filed: Mar. 19, 2001

(65) Prior Publication Data

US 2001/0025331 A1    Sep. 27, 2001

(30) Foreign Application Priority Data

Mar. 22, 2000   (JP) ............................. 2000-079917

(51) Int. Cl.
*G06F 11/30*   (2006.01)
*H04L 9/32*    (2006.01)

(52) U.S. Cl. ...................... 713/193; 713/164; 713/167; 713/172; 713/185; 713/189; 726/9; 235/380; 455/558

(58) Field of Classification Search ................ 713/193, 713/189, 200, 164, 167, 172, 185; 705/64, 705/65, 67, 68, 70, 73; 235/380, 379; 455/558; 726/9
See application file for complete search history.

(56) References Cited

U.S. PATENT DOCUMENTS

| | | | | |
|---|---|---|---|---|
| 5,917,168 A | * | 6/1999 | Nakamura et al. | 235/379 |
| 5,987,438 A | * | 11/1999 | Nakano et al. | 705/41 |
| 6,029,892 A | * | 2/2000 | Miyake | 235/380 |
| 6,095,413 A | * | 8/2000 | Tetro et al. | 235/380 |
| 6,179,205 B1 | * | 1/2001 | Sloan | 235/382 |
| 6,213,390 B1 | * | 4/2001 | Oneda | 235/379 |

FOREIGN PATENT DOCUMENTS

| | | |
|---|---|---|
| EP | 0 843 290 A2 | 5/1998 |
| EP | 0 887 774 A2 | 12/1998 |
| EP | 0 965 938 A2 | 12/1999 |
| GB | 2 338 832 A | 12/1999 |
| JP | 09-223112 | 8/1997 |
| JP | 11-15927 | 1/1999 |
| JP | 11-30953 | 2/1999 |
| JP | 11-030953 | 2/1999 |
| JP | 2899464 | 3/1999 |
| JP | 11-96252 | 4/1999 |
| JP | 11-110593 | 4/1999 |
| WO | WO 95/04328 | 2/1995 |

* cited by examiner

*Primary Examiner*—Kim Vu
*Assistant Examiner*—Beemnet W Dada
(74) *Attorney, Agent, or Firm*—Sughrue Mion, PLLC (57) ABSTRACT

A portable terminal includes a storage device, a system unit, a signal transfer line set and a control section. The storage device stores secret data. The system unit receives the secret data from the storage unit to carry out a predetermined process associated with the secret data. The signal transfer line set is provided between the storage device and the control unit and on which a control signal and the secret data are transferred. The control signal is related to the transfer of the secret data. The control section is connected to the signal transfer line set and validates transfer of a control signal from the storage device to the system unit or from the system unit to the storage device on the signal transfer line set to permit the transfer of the secret data.

26 Claims, 9 Drawing Sheets

PORTABLE TERMINAL APPARATUS WITH SECURITY FUNCTION

BACKGROUND OF THE INVENTION

1. Field of the Invention

The present invention relates to a portable terminal apparatus, and more particularly to a portable terminal apparatus for accessing private data for secret to be kept.

2. Description of the Related Art In the recent progress in integration technology, mounting technology and communication technology, it is now possible to access from a portable terminal apparatus represented by a portable phone to various servers on the Internet on which computer networks are connected to each other. Accordingly, the portable terminal apparatus can display, on its display unit, not only transmission and reception of electronic mails, but also data of characters and images of content data acquired from various servers. As the system for allowing content data to be acquired by such portable terminal apparatus, for example, a WAP (Wireless Application Protocol) system is known.

When a transaction from the portable terminal apparatus through the network is settled, e.g., when various servers on the Internet are accessed from the portable terminal apparatus for online shopping or settlement in the WAP system, individual verification is needed. For the individual validation, hitherto, the user enters a password from a ten-key board of the portable terminal apparatus. However, for the convenience of the user, the private data stored in an IC card to be loaded in the terminal apparatus can be utilized. In the IC card, generally, the password required for individual validation is registered previously. When an access is requested, the IC card receives the password, and only when the received password coincides with the registered password, the access request is accepted. An example of such IC card is an electronic money card for managing the electronic money in which the value of currency is electronically replaces into electronic data.

In such portable terminal apparatus for acquiring various content data from the servers on the network which is an external structure, an IC card such as the electronic money card for accessing the private data for secret to be kept may be installed. In this case, extraordinary safety is required to prevent the leakage of such stored data. For example, if the portable terminal apparatus is handed over to a third party, and the individual password is stolen, it is no longer possible to prevent illegal access to the private data or illegal settlement. For the reasons, various techniques have been proposed so far in order to enhance the safety of the portable terminal apparatus.

For example, the portable terminal apparatus disclosed in Japanese Laid Open Patent Application (JP-A-Heisei 9-223112) and entitled "Authorized user recognition apparatus and method of its use" is composed of a plurality of switches, in which a combination of switch states is registered previously. Only when the operated states of these switches are coincident with the registered combination, the password entered from a ten-key board of the portable terminal apparatus is checked. Therefore, even when the password is stolen, the combination of switch operated states is hardly known, so that the portable terminal apparatus of high safety is presented.

Also, in the portable terminal apparatus disclosed in Japanese Laid Open Patent Application (JP-A-Heisei 11-30953) and entitled "Electronic wallet and electronic money interlocked security system", the electronic money can be used only for a predetermined amount, and excessive payment is prevented.

Further, "Electronic money transaction system using multimedia portable terminal" disclosed in Japanese Laid Open Patent Application (JP-A-Heisei 11-96252) teaches a technique about a portable terminal apparatus enhanced in safety by combining a retina pattern and fingerprint as individual validation data.

However, the portable terminal apparatus applied in the WAP system is exposed to risk of invasion of virus or unjust program into the portable terminal apparatus when acquiring display data for displaying on the display unit from various servers on the network which is an external structure, or a control program to be executed in the apparatus as content data. In the hitherto proposed portable terminal apparatus, since the individual validation is processed in software, there is a risk that the IC card storing private data for secret to be kept such as electronic money card is illegally accessed by the virus or unjust program, so that the data may be stolen or destroyed. Moreover, there may be a case that a third party may unlawfully access the terminal apparatus by use of a communication function in secret to carry out similar illegal deed. Such possibility is also a mental burden for the user of the portable terminal apparatus.

To prevent such illegal deeds, therefore, the portable terminal apparatus must be designed with sufficient safety. In the techniques relating to the conventionally proposed portable terminal apparatus, a heavy processing load is required in the complicated validation process using the retina and fingerprint, or the terminal apparatus is increased in size if the plurality of switches are provided. Such requirements are demerits for the portable terminal apparatus to be applied to the WAP system which is designed to reduce the terminal load as much as possible.

In conjunction with the above description, an IC card system is disclosed in Japanese Laid Open Patent Application (JP-A-Heisei 11-15927). In this reference, the IC card system is composed of an IC card, IC card reading and writing means for reading and writing from and into the IC card, communication means for connecting with the communication network, control means for controlling the above IC card reading and writing means and the above communication means, and a server system which is connected with the above communication network. The data indicative of a specific location to be accessed in the above server system has been written in the above IC card. The above control means automatically accesses the above server system through the above communication means in accordance with the data of the location to be accessed. The above server system provides data to the end of the data service which is automatically determined based on the data to be provided, the end of the data service written in the above IC card or the end of the data service which the user specified.

Method of paying expressway charge is disclosed in Japanese Laid Open Patent Application (JP-A-Heisei 11-110593). In this reference, a phone in a car is used and expressway charge is paid together with communication charge of the phone. A call is carried out from the phone in the car to an expressway charge adjustment apparatus. After necessary data is sent and the call is disconnected, the call is received by a monitor provided for a pike and the expressway charge adjustment apparatus. The expressway charge adjustment apparatus transmits permission to both of the phone and the monitor at the same time based on the data. Thus, when a signature from the phone is coincident with the signature transmitted from the expressway charge adjustment apparatus, the monitor permits passage of the car. Also, the expressway charge adjustment apparatus calculates the expressway charge and requires the expressway charge together with communication charge.

Also, a method of movement of electronic property data is disclosed in Japanese Patent No. 2,899,464. In this reference, each of first to third portable data carriers has coupling means with a portable terminal, non-volatile memory means which is rewritable, and calculation means, and has electronic property data. A first portable terminal can accept the first and second data carriers. A second portable terminal can accept the second and third data carriers, and has all amount transfer means. The first and second data carriers are connected to a portable terminal and a part or whole of electronic property data stored in the non-volatile memory means of the first data carrier is transferred to the non-volatile memory means of the second data carrier via the first portable terminal. Then, the second and third data carriers are connected with the second portable terminal, and the whole of electronic property data stored in the non-volatile memory means of the second data carrier is transferred to the non-volatile memory means of the third data carrier via the second portable terminal.

SUMMARY OF THE INVENTION

Therefore, an object of the present invention is to provide a portable terminal apparatus which can assure safety even if illegal access is carried out by a third party.

Another object of the present invention is to provide a portable terminal apparatus which can reduce the load for individual validation processing.

In an aspect of the present invention, a portable terminal includes a storage device, a system unit, a signal transfer line set and a control section. The storage device stores secret data. The system unit receives the secret data from the storage unit to carry out a predetermined process associated with the secret data. The signal transfer line set is provided between the storage device and the control unit and on which a control signal and the secret data are transferred. The control signal is related to the transfer of the secret data. The control section is connected to the signal transfer line set and validates transfer of a control signal from the storage device to the system unit or from the system unit to the storage device on the signal transfer line set to permit the transfer of the secret data.

Here, the storage device may be detachable, and the secret data may be personal data of user. Instead, the storage device may be a detachable electronic money card, and the secret data may be electronic money data.

Also, the system unit may output the control signal to the storage device, and stop the predetermined process when the secret data cannot be received from the storage device within a predetermined time period after the control signal is outputted from the system unit to the storage device. In this case, the system unit may carry out the predetermined process when the secret data is received from the storage device within the predetermined time period after the control signal is outputted from the system unit to the storage device.

Also, the system unit may determine whether a total amount of electronic money used within a predetermined time interval is equal to or less than a predetermined amount of electronic money when the secret data is received from the storage device within the predetermined time period after the control signal is outputted from the system unit to the storage device, and may carry out the predetermined process when it is determined that the total amount of electronic money used within the predetermined time interval is equal to or less than the predetermined amount of electronic money. In this case, the system unit may stop the predetermined process when it is determined that the total amount of electronic money used within the predetermined time interval is larger than the predetermined amount of electronic money.

Also, the control section may include a switch section and a control circuit. The switch section generates a valid signal in response to operation of the switch section by a user. The control circuit operates to permit transfer of the control signal in response to the valid signal such that the transfer of the secret data is permitted. In this case, the switch section generates an invalid signal when the switch section is not operated. The control circuit operates to inhibit the transfer of the control signal in response to the invalid signal such that the transfer of the secret data is inhibited.

The switch section may include at least a button, and the portable terminal may have a side surface on which the switch section is provided. In addition, a concave surface may be formed in a portion of the side surface and the switch section may be provided on the concave surface.

In another aspect of the present invention, a portable terminal includes a detachable storage device, a system unit, a signal transfer line set and a control section. The detachable storage device stores secret data. The system unit outputs a control signal to the storage device, receives the secret data relating to the control signal from the storage unit, and carries out a predetermined process associated with the secret data when the secret data is received from the storage device within the predetermined time period after the control signal is outputted from the system unit to the storage device. The signal transfer line set is provided between the storage device and the control unit and on which the control signal and the secret data are transferred. The control section is connected to the signal transfer line set and validates the control signal from the system unit to the storage device on the signal transfer line set to permit the transfer of the secret data.

Here, the system unit may stop the predetermined process when the secret data cannot be received from the storage device within a predetermined time period after the control signal is outputted from the system unit to the storage device.

Also, the system unit may further determine whether a total amount of electronic money used within a predetermined time interval is equal to or less than a predetermined amount of electronic money when the secret data is received from the storage device within the predetermined time period after the control signal is outputted from the system unit to the storage device. Then, the system unit may carry out the predetermined process when it is determined that the total amount of electronic money used within the predetermined time interval is equal to or less than the predetermined amount of electronic money. In this case, the system unit may stop the predetermined process when it is determined that the total amount of electronic money used within the predetermined time interval is larger than the predetermined amount of electronic money.

Also, the control section may include a switch section and a control circuit. The switch section generates a valid signal in response to operation of the switch section by a user. The control circuit which operates to permit transfer of the control signal in response to the valid signal such that the transfer of the secret data is permitted. In this case, the switch section may generate an invalid signal when the switch section is not operated. The control circuit operates to inhibit the transfer of the control signal in response to the invalid signal such that the transfer of the secret data is inhibited. Also, the switch section may include at least a button.

In still another aspect of the present invention, a portable terminal includes a detachable storage device, a system unit, a switch section and a control circuit. The detachable storage device stores secret data. The system unit outputs a control signal to the storage device, and receives the secret data relating to the control signal from the storage unit to carry out a predetermined process associated with the secret data. The switch section generates a valid signal in response to operation of the switch section by a user. The control circuit operates to permit transfer of the control signal from the system unit to the storage device in response to the valid signal such that the transfer of the secret data from the storage device to the system unit is permitted.

Here, the system unit may stop the predetermined process when the secret data cannot be received from the storage device within a predetermined time period after the control signal is outputted from the system unit to the storage device. In this case, the system unit may carry out the predetermined process when the secret data is received from the storage device within the predetermined time period after the control signal is outputted from the system unit to the storage device.

Also, the system unit may determine whether a total amount of electronic money used within a predetermined time interval is equal to or less than a predetermined amount of electronic money when the secret data is received from the storage device within the predetermined time period after the control signal is outputted from the system unit to the storage device. Then, the system unit may carry out the predetermined process when it is determined that the total amount of electronic money used within the predetermined time interval is equal to or less than the predetermined amount of electronic money. In this case, the system unit may stop the predetermined process when it is determined that the total amount of electronic money used within the predetermined time interval is larger than the predetermined amount of electronic money.

Also, the switch section may generate an invalid signal when the switch section is not operated. In this case, the control circuit operates to inhibit the transfer of the control signal in response to the invalid signal such that the transfer of the secret data is inhibited.

DESCRIPTION OF THE PREFERRED EMBODIMENTS

A portable terminal apparatus of the present invention will be described below in detail with reference to the attached drawings.

Figure 1:
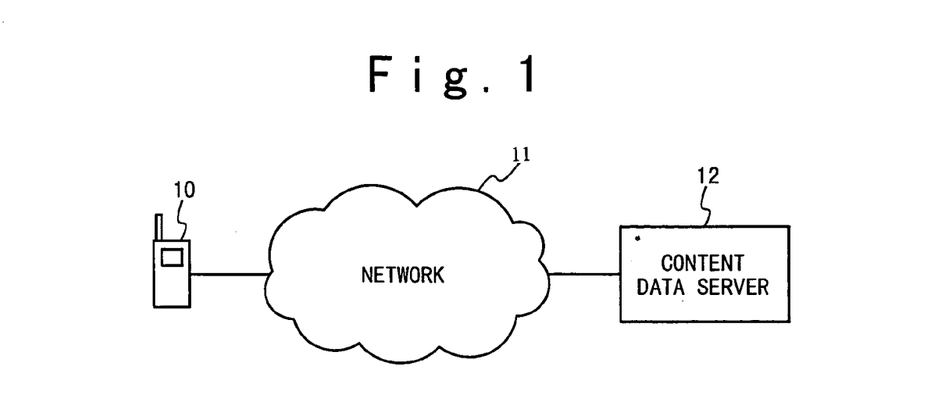
FIG. 1 is a block diagram showing an overview of the structure of a data communications system to which the portable terminal apparatus according to a first embodiment of the present invention is applied.

FIG. 1 is a schematic diagram of the configuration of a data communication system to which the portable terminal apparatus according to the first embodiment of the present invention is applied. The portable terminal apparatus 10 in the first embodiment is connected to a content data server 12 through a network 11. The portable terminal apparatus 10 is composed of a display unit such as a liquid crystal display (LCD), and data received through the network 11 is displayed on the display unit. In the portable terminal apparatus 10, a detachable IC card such as an electronic money card for storing private data for secret to be kept is loaded in a predetermined loading unit, and the stored data can be freely read or written by the authorized user. The network 11 is such as a portable phone network, and the portable terminal apparatus 10 exchanges data with the content data server 12 depending on a communication format. The content data server 12 stores content data composed of data in various data formats such as characters and images.

In such a data communication system, the portable terminal apparatus 10 accesses the content data server 12 through the network 11. The content data stored in the content data server 12 is received by the portable terminal apparatus 10, temporarily stored therein, and displayed on the display unit thereof. It is supposed that the received content data is a homepage for online shopping and the electronic money card is installed in the portable terminal apparatus 10. In this case, the user of the portable terminal apparatus 10 designates an article to be purchased by use of a ten-key board of the portable terminal apparatus in accordance with a display content such as guidances or instructions. Then, the user inputs a password for individual validation for drawing electronic money from the installed electronic money card. When the inputted password is correct, the electronic money is drawn from the installed electronic money card. The purchase data and electronic money data are transmitted from the portable terminal apparatus 10 to the content data server 12 through the network 11. The purchase data is for designating the article to be purchased. A manager of the content data server 12 carries out the settlement of the received electronic money data to a settling agent contracting with the user of the portable terminal apparatus 10.

The portable terminal apparatus 10 in the first embodiment has a security button. When the user of the portable terminal apparatus 10 is not operated the security button, a control signal for accessing the electronic money card installed in the parable terminal apparatus can be forcedly disconnected or blocked off. The portable terminal apparatus 10 is described in detail below.

Figure 2:
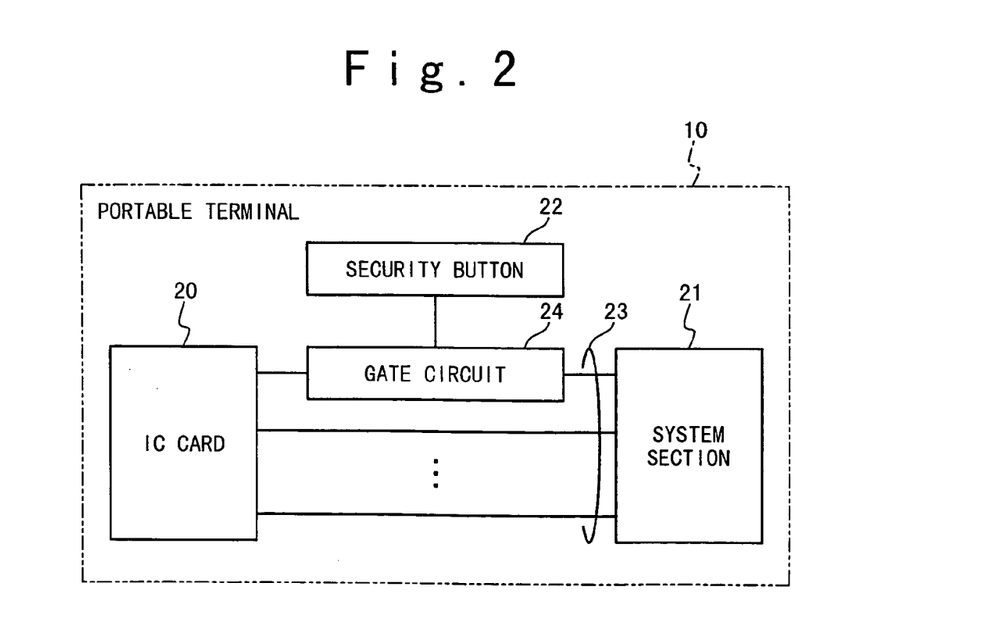
FIG. 2 is a block diagram showing an overview of the structure of the portable terminal apparatus in the first embodiment.

FIG. 2 is a schematic diagram of the configuration of the portable terminal apparatus in the embodiment. The portable terminal apparatus 10 is composed of a detachable IC card 20 loaded in a loading unit (not shown) and storing private data for secret to be kept, a system section 21 having a communication function for transmitting and receiving various data through the network 11 shown in FIG. 1 and an access function to the private data stored in the IC card 20, and a security button 22 to be operated by the user of the portable terminal apparatus 10. In the IC card 20, a password necessary for individual validation is registered previously. When reading or writing of stored data in the IC card 20 is externally requested, the password is read out from the IC card 20 to the system section 21. Only when an inputted password is coincident with the read out password, the request is accepted, the system section 21 generates an IC card control signal for accessing the IC card 20 by its access function. The IC card control signal differs in accordance with interface specification between the loaded IC card 20 and the system section 21, and includes a read control signal, a write control signal, and a data bus signal. However, the control signal is not limited by them alone.

The IC card control signal is electrically transmitted from the system section 21 to the IC card 20 through IC card control signal lines 23. The private data stored in the IC card 20 is written or read depending on the IC card control signal. When the private data is read out, the private data is transmitted from the IC card 20 to the system section 21 through the IC card control signal lines 23. A gate circuit 24 is inserted in at least one of the IC card control signal lines 23 for connecting between the IC card 20 and system section 21 in hardware as a specific IC card control signal line.

The gate circuit 24 is designed to open or close a switch in the circuit depending on the operated state of the security button 22. Based on the opening or closing of the switch, the gate circuit 24 is switched to the electrically connected state or disconnected state of the specific IC card control signal line. That is, when the security button 22 of the portable terminal apparatus 10 is physically operated by the user, the switch of the gate circuit 24 is closed. Thus, the specific IC card control signal line is electrically connected. Therefore, the IC card 20 is accessed in response to the IC card control signal supplied from the system section 21. By contrast, when the security button 22 is released by the user of the portable terminal apparatus 10, the switch of the gate circuit 24 is opened, so that the specific IC card control signal line is electrically disconnected. As a result, it is not possible to access the IC card 20 based on the IC card control signal from the system section 21.

Therefore, unless the user of the portable terminal apparatus 10 operates the security button 22, the system section 21 cannot access the IC card 20. Therefore, the security button 22 prevents a third party from invading into the portable terminal apparatus 10 through the network without permission of the user to access the system section 21 and to destroy or steal the stored data in the IC card 20.

As an example of the portable terminal apparatus of the first embodiment, a portable phone will be specifically described below.

Figure 3:
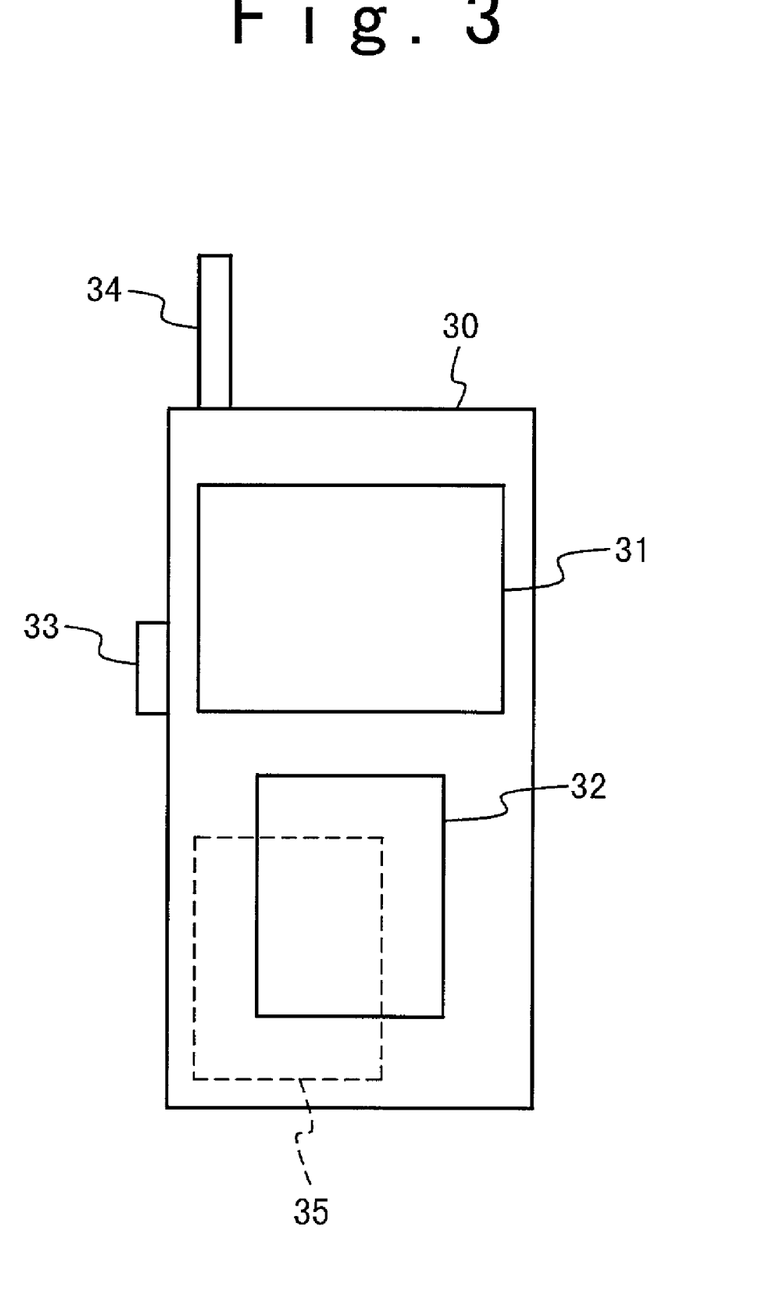
FIG. 3 is a front view showing an outward appearance of an portable phone as the portable terminal apparatus in the first embodiment.

FIG. 3 is a front view of the appearance of a portable phone as the portable terminal apparatus in the first embodiment. A portable phone 30 as the portable terminal apparatus in the first embodiment is composed of a display unit 31 of LCD provided on the front face of the main body, a ten-key board 32 disposed on a same plane as the display unit 31, and a security button 33 disposed at the side of the main body, and an antenna 34 disposed on the upper side of the main body. The portable phone 30 is further composed of a loading unit for loading a detachable electronic money card in the back or side of the main body. It is supposed herein that an electronic money card 35 is loaded in the loading unit.

Figure 4:
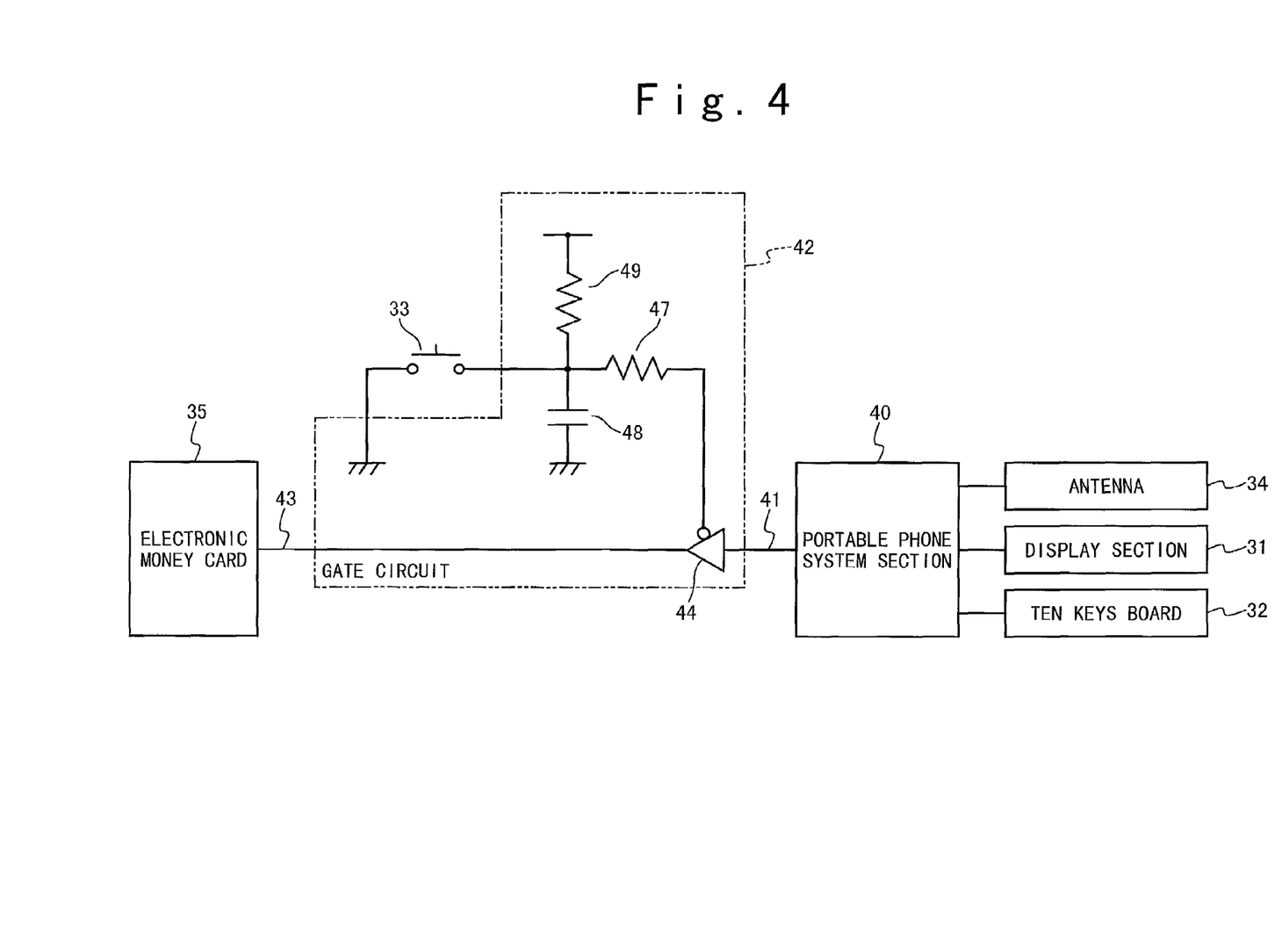
FIG. 4 is a block diagram showing the structure of a main section of the portable phone of FIG. 3 in the first embodiment.

FIG. 4 shows essential parts of the portable phone as the portable terminal apparatus shown in FIG. 3. Same parts as in the portable phone in FIG. 3 are identified with same reference numerals. The portable phone as the portable terminal apparatus in the first embodiment is composed of a portable phone system section 40 connected to the antenna 34, the display unit 31 and the ten-key board 32. The portable phone system section 40 is connected with the content data server on the network. The system section 40 communicates with the content data server by radio wave transmitted from the antenna 34 in accordance with a user instruction entered from the ten-key board 32. The system section 40 displays the received content data on the display unit 31. Also, the portable phone system section 40 generates an electronic money card control signal for accessing the electronic money card 35. The electronic money card control signal is supplied to a gate circuit 42 through a specific electronic money card control signal line 41. The gate circuit 42 switches the electronic money card control signal line 41 to the electrically connected state or disconnected state depending on the operated state of the security button 33. In the connected state, the specific electronic money card control signal is transmitted from the portable phone system section 40 to the electronic money card 35 through the specific electronic money card control signal line 41 and 43.

The gate circuit 42 is composed of a buffer with control terminal 44, and a control signal generating circuit. The input terminal of the buffer with control terminal 44 is connected with the specific electronic money card control signal line 41, and its output terminal is connected with the specific electronic money card control signal line 43. The control signal generating circuit generates a control signal as a valid/invalid signal. The valid signal is in a low level and the invalid signal in a high level. The valid/invalid signal is supplied the control terminal of the buffer 44.

The buffer with control terminal 44 sets its output terminal in high impedance state when the valid/invalid signal supplied to the control terminal is in high level state. On the other hand, when the valid/invalid signal is in low level state, the electronic money card control signal supplied to the input terminal of the buffer is electrically amplified, and outputted to the electronic money card 35 from the output terminal of the buffer.

The security button 33 is switched into the open or closed state depending on the operated state. The control signal generating circuit is composed of a chattering preventing circuit for preventing chattering of the security button switch 33. One side of the security button switch 33 is grounded, and the other is connected to the control terminal of the buffer with control terminal 44 through a first resistance element 47. The node of the first resistance element 47 and the switch 33 is grounded through a capacitor 48, and is connected to a power supply voltage line through a second resistance element 49.

In the control signal generating circuit having such configuration, when the security button switch 33 is not operated, the switch 33 is open. Therefore, the node between the first resistance 47 and the switch 33 is connected to the power supply voltage line through the second resistance elements 49 so that the valid/invalid signal to be supplied to the control terminal of the buffer 44 is set to the high level state electrically. Thus, the buffer 44 sets its output terminal in the high impedance state, and the electronic money card control signal lines 41 and 43 are electrically disconnected. As a result, the electronic money card control signal generated in the portable phone system section 40 is not transmitted to the electronic money card 35.

On the other hand, when the security button 33 is operated by the user of the portable phone, the switch 33 is closed. The valid/invalid signal to be supplied to the control terminal of the buffer 44 via the first resistance element 47 is grounded, and is electrically in low level state. Therefore, the buffer 44 electrically amplifies the electronic money card control signal received through the specific electronic money card control signal line 41 connected to the input terminal of the buffer 44, and outputs to the electronic money card 35 from the output terminal connected to the electronic money card control signal line 43. That is, the electronic money card control signal lines 41 and 43 are electrically connected, and the electronic money card control signal generated in the portable phone system section 40 is transmitted to the electronic money card 35.

As a result, in the portable phone shown in FIG. 4, unless the security button 33 is operated, the portable phone system section 40 cannot access the electronic money card 35, and while the security button 33 is operated, the portable phone system section 40 can access the electronic money card 35.

Next, the operation of the portable phone system section 40 will be described for generating an electronic money card control signal. The portable phone system section 40 has a central processing unit (CPU: not shown), and is designed to execute an access process to the electronic money card in accordance with a control program stored in a predetermined memory device such as a read-only memory (ROM) in the system section 40.

Figure 5:
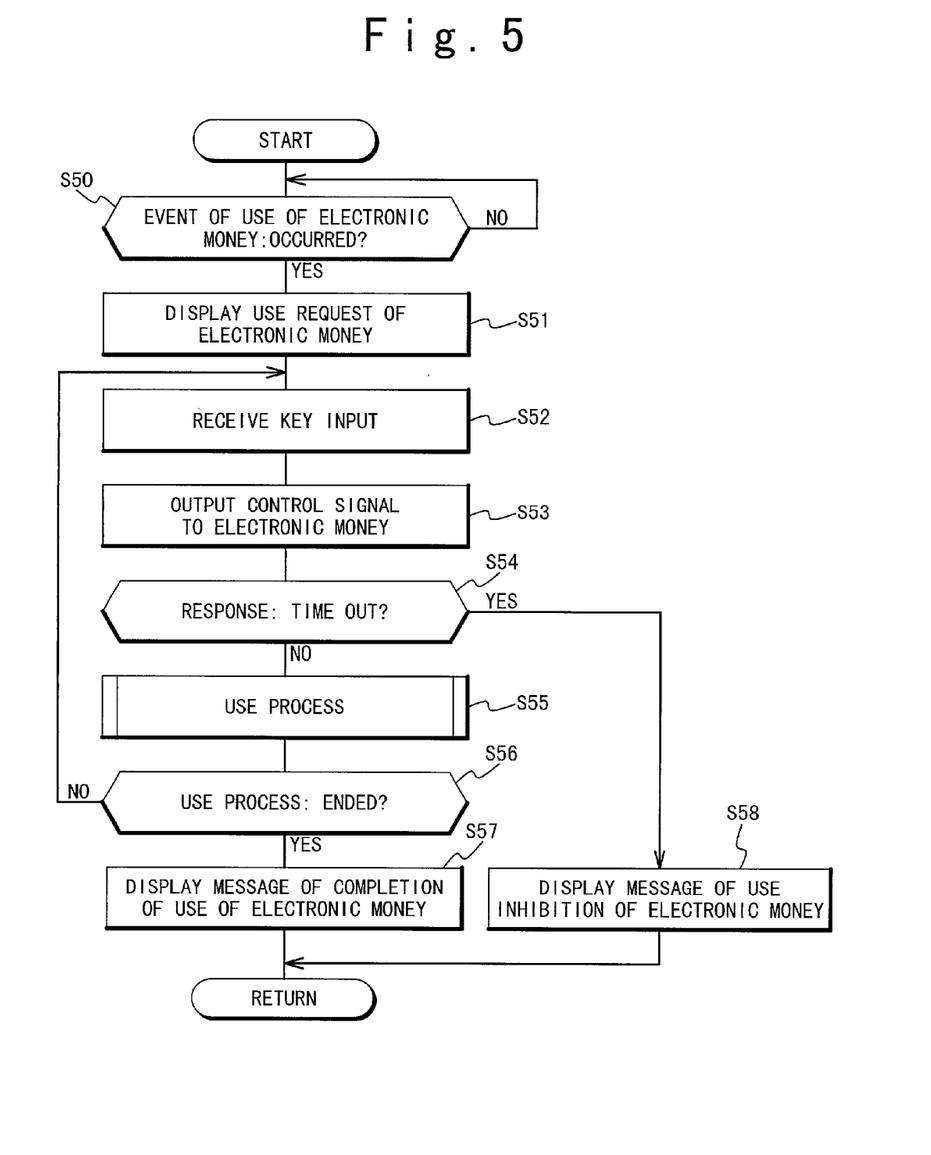
FIG. 5 is a flow chart showing a processing operation of a portable phone system section of the portable phone in the first embodiment.

FIG. 5 schematically shows a processing operation of the portable phone system section for accessing the electronic money card. When the user of the portable phone shown in FIG. 3 designates to acquire a content data stored in the content data server 12 on the network 11 through the ten-key board 32, the portable phone request the designated content data by accessing the content data server 12 through the network 11. The acquired content data is received through the antenna 34, and displayed on the display unit 31.

The portable phone system section 40 monitors presence or absence of occurrence of an event in which electronic money is used (step S50: N). Herein, it is supposed that the received content data is an online sales guide and the user of the terminal apparatus pays by the electronic money. In this case, an event using electronic money takes place. When the portable phone system section 40 detects the occurrence of the event (step S50: Y), the display unit 31 displays a request for using electronic money (step S51).

The request for use of electronic money is displayed on the display unit 31 to instruct the user of the portable phone to operate the security button 33 when approving the event using the electronic money, and not to operate the security button 33 when not approving.

The portable phone system section 40 continues the event using the electronic money regardless of the operated state of the security button 33, and receives data necessary for use of electronic money from the ten-key board 32 (step S52). In response to the received data, the portable phone system section 40 generates an electronic money card control signal, and sends out to the electronic money card 35 through the electronic money card control signal lines 23 (step S53).

When the electronic money card control signals are generated at step S53, a predetermined time-out time starts to be counted. thus, a response from the electronic money card 35 is monitored (step S54). It is supposed that a response is made from the electronic money card 35 in response to the electronic money card control signal generated at step S53 before the predetermined time-out time expires (step S54: N). For example, electronic money data is transmitted from the electronic money card 35 to the system section 40. In this case, a predetermined process using electronic money is executed (step S55), unless the process using electronic money data is not completed (step S56: N. Then, the control flow returns to step S53, input of data necessary for use of electronic money from the ten-key board 32 is waited for.

When the process using electronic money is completed at step S56 (step S56: Y), a completion message of using electronic money is displayed on the display unit 31 (step S57), and occurrence of an event using electronic money is monitored again (return).

At step S54, if any response is not made from the electronic money card 35 in response to the electronic money card control signal generated at step S53 until expiration of the predetermined response time-out time (step S54: Y), it is determined that the security button 33 is not operated or the electronic money card is not installed. As a result, it is determined that the user of the portable phone does not approve the event using electronic money, and a message disabling use of the electronic money card is displayed in the display unit 31 (step S58). Then, a stop process for stopping the predetermined process of using electronic money is executed. Thereafter, an occurrence of an event using electronic money is monitored again.

In this way, the portable terminal apparatus of the first embodiment executes the process of using electronic money regardless of the operated state of the security button, and the operated state of the security button 33 is detected based on the lapse of the predetermined time-out time. Thus, the operated state of the security button 33 by virus, illegal program or unjust deed is detected without any error.

In such a portable terminal apparatus, meanwhile, various constituent elements may be considered in place of the buffer with control terminal 44 shown in FIG. 4.

Figure 6:
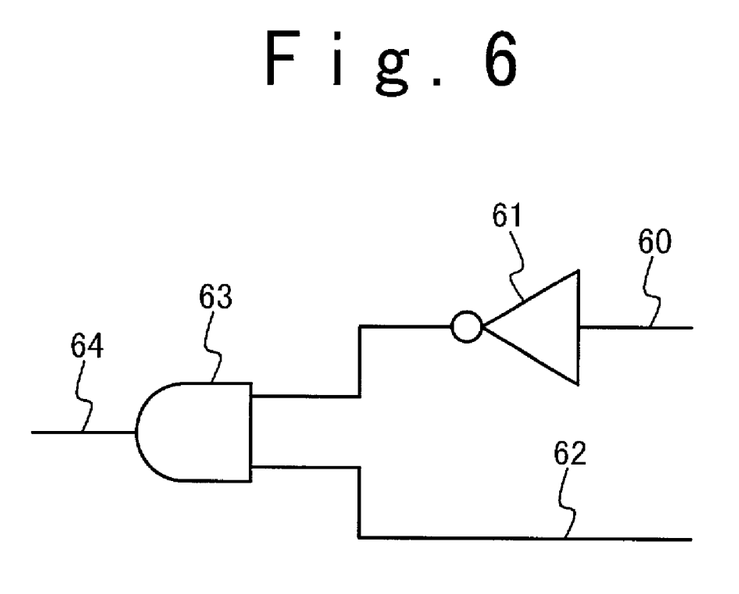
FIG. 6 is a diagram showing the structure of a logic circuit which achieves a function similar to a buffer with control terminal in FIG. 4.

FIG. 6 shows the configuration of a logic circuit for fulfilling the same function as the buffer with control terminal shown in FIG. 4. That is, the logic circuit is composed of a NOT circuit 61 which receives the valid/invalid signal 60 generated in the control signal generating circuit 45, and a two-input one-output AND circuit 63 which is connected to the output terminal of the NOT circuit 61 at one terminal and receives an electronic money card control signal 62 generated by the portable phone system section 40 at other terminal. In such a logic circuit, the valid/invalid signal 60 is inverted logically, and a logic product of the inverted valid/invalid signal and the electronic money card control signal 62 is calculated. The result of the logic product is sent to the electronic money card 35 as an electronic money card control signal 64. As a result, while the security button 33 is not operated, the electronic money card control signal 64 of logic level of "L" is always generated. Meanwhile, depending on the configuration of the control signal generating circuit, if the valid signal is in the low level in the open state of the security button switch 33 and the valid signal is in the high level in the open state of the switch 33, the NOT circuit 61 can be omitted.

Figure 9:
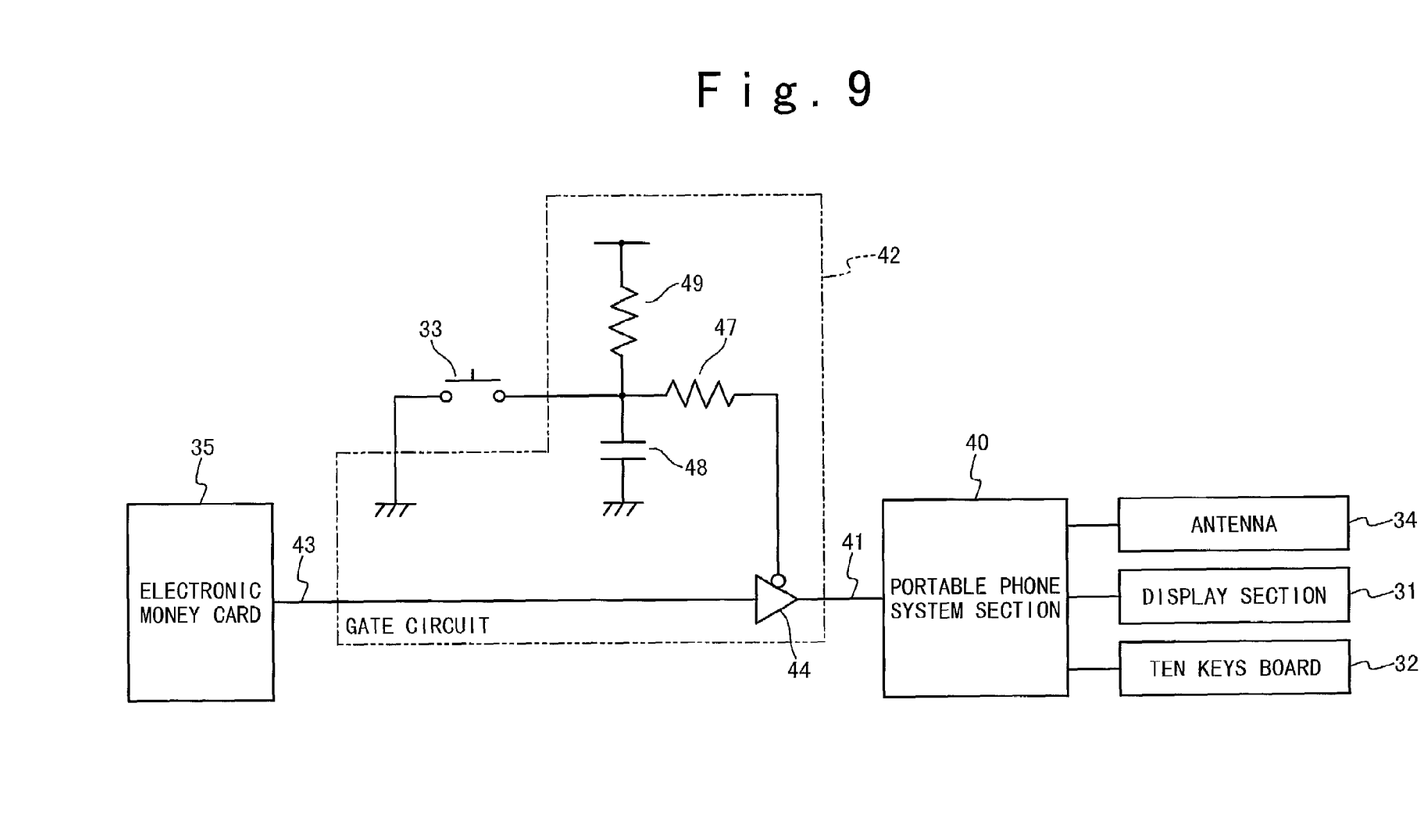
FIG. 9 is a block diagram showing the structure of the main section of the portable terminal apparatus according to a second modification of the present invention.

In FIG. 4, moreover, it is described that the electronic money card control signal generated by the portable phone system section 40 is sent out to the electronic money card 35. However, the configuration and operation are not limited to this. To the contrary, the electronic money card control signal may be generated from the electronic money card and supplied to the portable phone system section, as shown in FIG. 9. In this case, the direction of the buffer with control terminal may be inverted. Further, when the electronic money card control signal is transmitted in both directions between the portable phone system section and electronic money card, a transceiver with control terminal may be used instead of the buffer with control terminal.

The single electronic money card control signal line 41 or 43 is show. However, the number of lines is not limited to this. If a plurality of electronic money card control signal lines are used, the gate circuit may be inserted only in one or specified number of the lines.

As described above, the portable phone as the portable terminal apparatus in the first embodiment is composed of an electronic money card as a detachable IC card for storing private data for secret to be kept, a portable phone system section 40 for generating the electronic money card control data for accessing it, and the security button 33. Only when the security button 33 continues to be operated, the electronic money card control signal line for transmitting the electronic money card control signal from the portable phone system section 40 is connected electrically.

Thus, while the security button 33 is not operated, it is not allowed to access the electronic money card 35. Therefore, it is possible to prevent a third party from invading into the portable phone system section 40 from the antenna through the network 11 to access the electronic money card illegally, and to steal the electronic money or destroy the stored data in the electronic money card. Moreover, even if the third party installs a resident virus or illegal program for unlawfully accessing the electronic money card inside the portable phone system section 40 through the antenna, and the user operates the security button so that the illegal program accesses the electronic money card, the user inspects the data in the electronic money card before and after pressing the security button, consequently, invasion of illegal program and its loss can be detected right after illegal access. Therefore, in the event of an illegal access, its reaction can be made promptly, and in case an illegal access is attempted, its loss can be kept to a minimum amount.

In the portable phone as the portable terminal apparatus in the first embodiment, if an unjust program has invaded through the antenna, as far as the security button continues to be operated as shown in FIG. 5, there is possibility of illegal access. Accordingly, in the portable phone as the terminal apparatus in the second embodiment, the amount of money drawn from the electronic money card within a specified time interval is limited, and it is intended to prevent theft of a large amount of electronic money from a resident unjust program.

The configuration of the portable phone in the second embodiment is same as that of the portable phone of the first embodiment as shown in FIG. 3 and FIG. 4, and its description is omitted.

Figure 7:
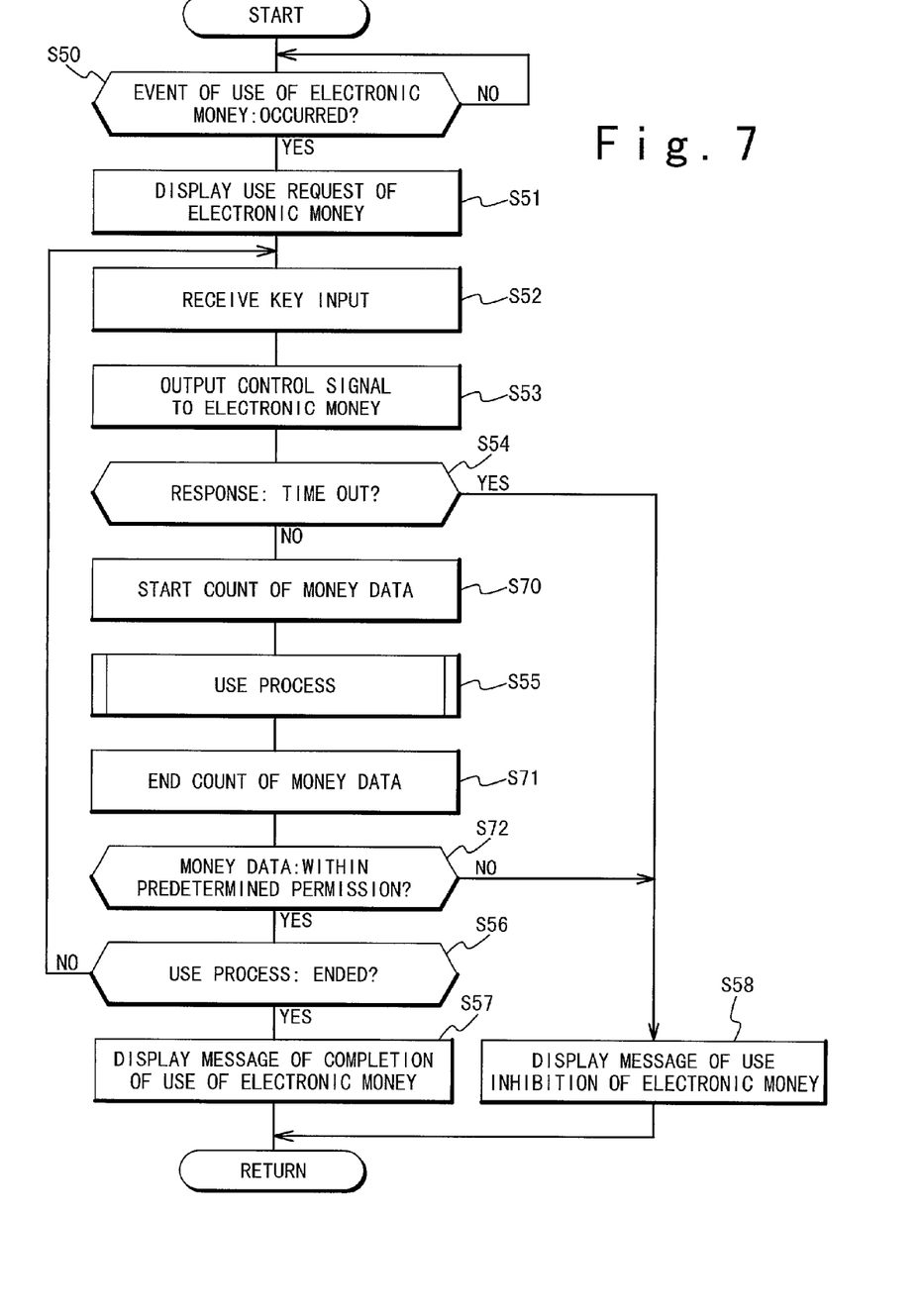
FIG. 7 is a flow chart showing a processing operation of the portable phone system section which accesses an electronic money card.

FIG. 7 shows outline of processing of the portable phone system for accessing the electronic money card in the second embodiment. The same steps as in the processing of the portable phone system in the first embodiment shown in FIG. 5 are identified with same reference numerals, and the description is omitted. The operation of the portable phone in the second embodiment is different from the operation of the portable phone in the first embodiment shown in FIG. 5 in the inserted steps S70 to S72.

That is, when a response is made from the electronic money card 35 before expiration of the specified response time-out time at step S54 (step S54: N), measurement of transaction amount data is started (step S70) to carry out the predetermined process of using electronic money (step S55). The transaction amount data indicates the amount of the electronic money that can be drawn from the electronic money card measured within the specified measurement time interval.

After the using process execution (step S55), measurement of transaction amount data is finished (step S71), and it is determined if the amount of the electronic money drawn from the electronic money card is within the predetermined amount (step S72). If it is determined to be within the predetermined amount (step S72: Y), it is determined at step S56 whether the use process is completed (step S56). On the other hand, at step S72, if the measured transaction amount data is not within the predetermined amount (step S72: N), possibility of theft by an unjust program is determined, and an electronic money use disable message is displayed on the display unit 31 (step S58). Then, a specified electronic money use discontinue process is executed, and the electronic money use process is stopped. Then, an occurrence of electronic money use event is monitored again (return).

In the portable phone as the portable terminal apparatus in the second embodiment, since the limit of amount of money to be drawn from the electronic money card is set in the specified measuring time interval in the portable phone of the second embodiment, an excessive draw of electronic money is determined to be high possibility of theft by the unjust program, thereby preventing theft of large amount of electronic money by the resident unjust program in the operated state of the security button 33.

Figure 8:
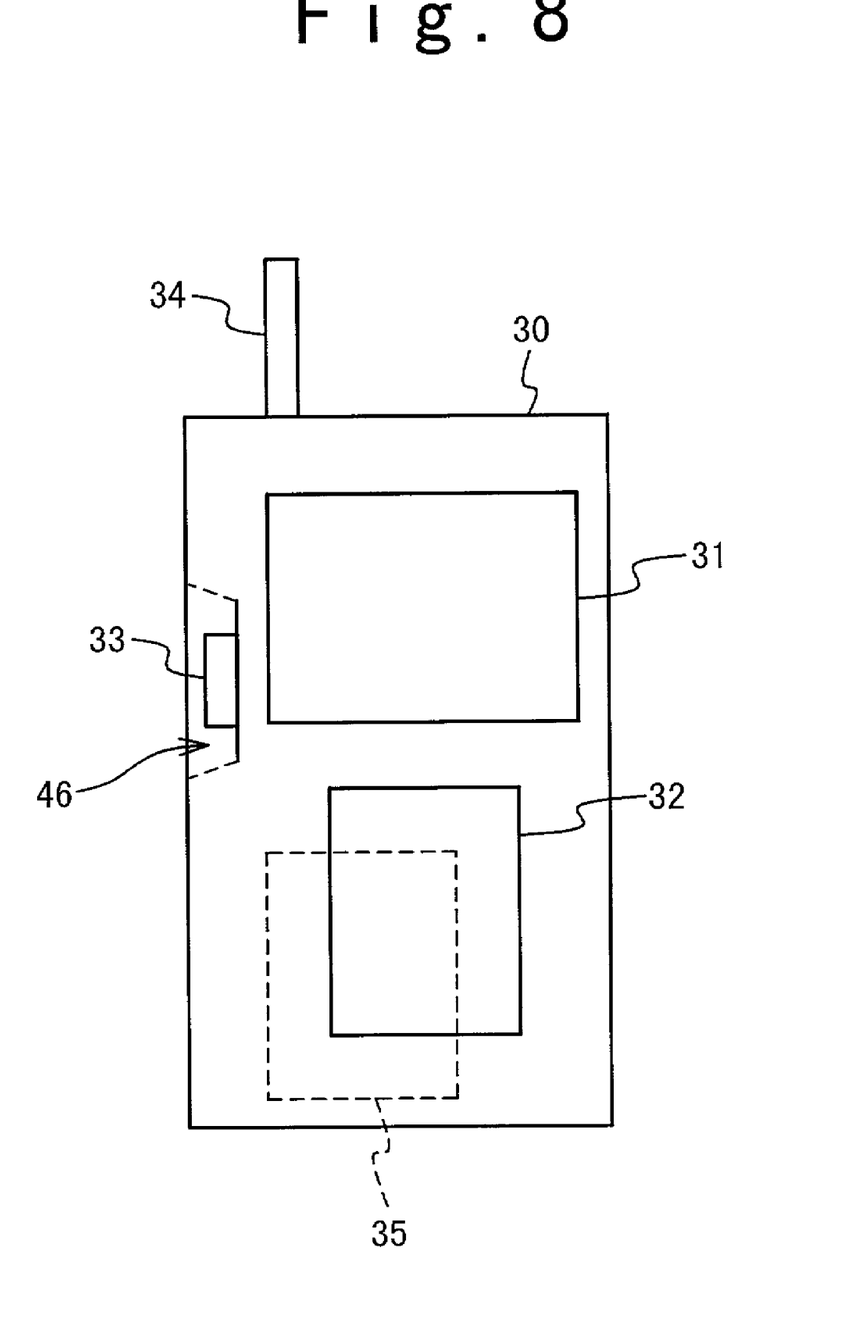
FIG. 8 is a diagram showing an outward appearance of the portable terminal apparatus according to a first modification of the present invention.
Figure 10:
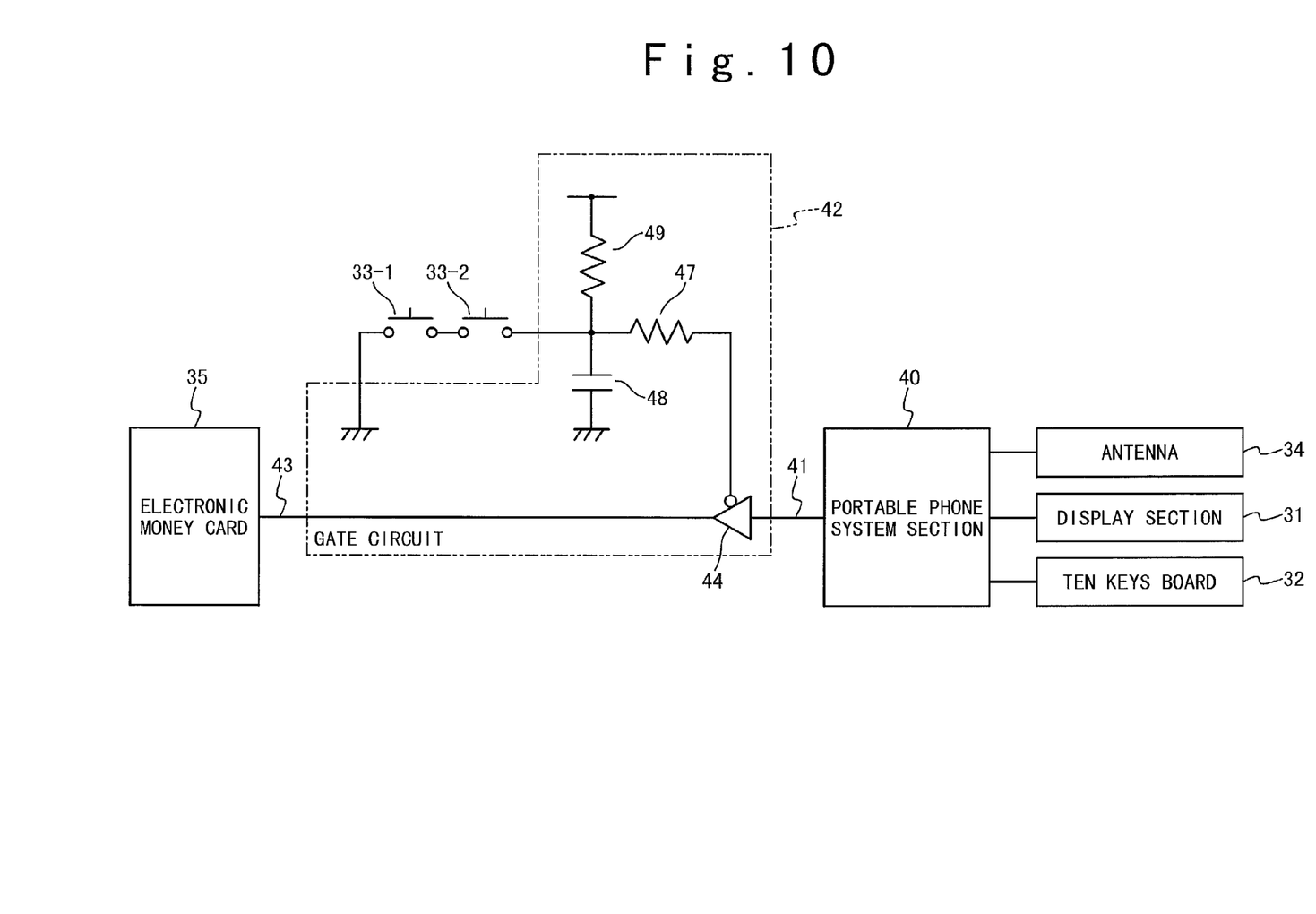
FIG. 10 is a block diagram showing the structure of the main section of the portable terminal apparatus according to a third modification of the present invention.

When electronic money is drawn out by the portable phone as the portable terminal apparatus in the first and second embodiments, the layout position of the security button may be changed for the ease of manipulation of the ten-key board for input of password for electronic money in the operated state of security button 33. For example, while manipulating the ten-key board by one hand, in order that the security button may be operated easily by holding the portable phone in other hand, the security button is disposed at the left side or right side of the main body of the portable phone. Moreover, to prevent illegal access by a third party, as the security button is operated accidentally while the portable phone is put in a bag, the security button may be provided in a recess of the side surface of the main body, as shown in FIG. 8, or a plurality of security buttons may be provided, as shown in FIG. 10. Thus, it is accessible to the electronic money only when the plurality of security buttons 33-1 and 33-2 are operated at the same time, or the security button may be protected with a cover.

Further, in the portable phone as the portable terminal apparatus in the second embodiment, by using the valid/invalid signal as an interrupt input signal for the portable phone system section 40, in addition to the buffer with control terminal, it is easily known that the user permits to draw electronic money from the electronic money card by the portable phone system section. Also, if an illegal access is attempted, the amount of electronic money drawn out is limited, and the loss is minimized, and presence and absence of illegal access is known.

In the portable terminal apparatus in the first and second embodiments, the electronic money card is described. However, the present invention is not limited to the above. The present invention is similarly applied to the IC card storing private data for secret to be kept. Further, as in the subscriber data module presented to each subscriber of a portable phone as portable terminal apparatus, it may be designed to access to the subscriber data only when the security button is operated, in part or whole of the subscriber data stored previously.

As described above, according to the present invention, it is designed to physically block off access to the data for secret to be kept, and access to the data by a third party by virus or unjust program contrary to the intent of the user of the portable terminal can be easily and securely prevented. Not necessary to add newly complicated process for individual validation, it contributes to reduction of size and cost of the device.

Also, according to the present invention, it is not permitted to access the data for secret to be kept stored in the storage means unless switch means is switched to a specified state, access by third party software contrary to the intent of the user of the portable terminal apparatus can be effectively prevented. If illegally accessed by a third party, unjust deed and loss can be detected immediately by inspecting the data stored in the storage means before and after switching of the switch, and counteraction to the unjust deed can be taken promptly. In the event of an unjust deed, therefore, the loss is kept to a minimum.

Also, according to the present invention, using the IC card, electronic money card, memory module storing subscriber data, and similar detachable storage media, the safety against unjust deed is maintained while the convenience of individual validation is improved.

Also, according to the present invention, since the amount of money drawn from the electronic money card within a specified measured time unit is limited, an excess draw of electronic money is determined to be high possibility of theft by unjust program, and therefore it prevents theft of large amount of electronic money by an unjust program resident in operated state of security button.

Also, according to the present invention, it is applicable to a portable terminal apparatus having wireless communication means, and it greatly reduce the risk of invasion of virus together with data received from outside of the network, third party's invasion through network to access unlawfully the storage means storing data for secret to be kept or steal data or destroy stored data.

Also, according to the present invention, for the ease of pressing of switch means while holding the portable terminal apparatus in one hand, the switch is disposed at the side face of the main body, so that the switch means may be operated only when necessary while referring to the display screen, and wasteful time of unnecessary pressing of switch means is curtailed, and the risk of unjust deed is lowered.

What is claimed is:

1. A portable terminal comprising:
    a storage device which stores secret data;
    a system unit which receives said secret data from said storage device carry out a predetermined process associated with said secret data;
    a signal transfer line set which is provided between said storage device and said system unit and on which a control signal and said secret data are transferred, said control signal relating to the transfer of said secret data; and
    a control section which is connected to said signal transfer line set and validates transfer of said control signal from said storage device to said system unit or from said system unit to said storage device on said signal transfer line set to permit the transfer of said secret data,
    wherein said control section comprises:
    a switch section which generates a valid signal in response to operation of said switch section by a user; and
    a control circuit which operates to permit transfer of said control signal in response to said valid signal such that the transfer of said secret data is permitted, and
    wherein said switch section generates an invalid signal when said switch section is not operated, and said control circuit operates to inhibit the transfer of said control signal in response to said invalid signal such that the transfer of said secret data is inhibited.

2. The portable terminal according to claim 1, wherein said storage device is detachable, and said secret data is personal data of user.

3. The portable terminal according to claim 1, wherein said storage device is a detachable electronic money card, and said secret data is electronic money data.

4. The portable terminal according to claim 1, wherein said system unit outputs said control signal to said storage device, and stops said predetermined process when said secret data cannot be received from said storage device within a predetermined time period after said control signal is outputted from said system unit to said storage device.

5. The portable terminal according to claim 4, wherein said system unit carries out said predetermined process when said secret data is received from said storage device within the predetermined time period after said control signal is outputted from said system unit to said storage device.

6. The portable terminal according to claim 4, wherein said system unit determines whether a total amount of electronic money used within a predetermined time interval is equal to or less than a predetermined amount of electronic money when said secret data is received from said storage device within the predetermined time period after said control signal is outputted from said system unit to said storage device, and carries out said predetermined process when it is determined that the total amount of electronic money used within the predetermined time interval is equal to or less than the predetermined amount of electronic money.

7. The portable terminal according to claim 6, wherein said system unit stops said predetermined process when it is determined that the total amount of electronic money used within the predetermined time interval is larger than the predetermined amount of electronic money.

8. The portable terminal according to claim 1, wherein said switch section includes at least a button.

9. The portable terminal according to claim 8, wherein said portable terminal has a side surface on which said switch section is provided.

10. The portable terminal according to claim 9, wherein a concave surface is formed in a portion of said side surface and said switch section is provided on said concave surface.

11. A portable terminal comprising:
    a detachable storage device which stores secret data;
    a system unit which outputs a control signal to said storage device, receives said secret data relating to said control signal from said storage unit, and carries out a predetermined process associated with said secret data when said secret data is received from said storage device within the predetermined time period after said control signal is outputted from said system unit to said storage device;
a signal transfer line set which is provided between said storage device and said system unit and on which said control signal and said secret data are transferred; and
a control section which is connected to said signal transfer line set and validates said control signal from said system unit to said storage device on said signal transfer line set to permit the transfer of said secret data,
wherein said control section comprises:
a switch section which generates a valid signal in response to operation of said switch section by a user; and
a control circuit which operates to permit transfer of said control signal in response to said valid signal such that the transfer of said secret data is permitted, and
wherein said switch section generates an invalid signal when said switch section is not operated, and said control circuit operates to inhibit the transfer of said control signal in response to said invalid signal such that the transfer of said secret data is inhibited.

12. The portable terminal according to claim 11, wherein said system unit stops said predetermined process when said secret data cannot be received from said storage device within a predetermined time period after said control signal is outputted from said system unit to said storage device.

13. The portable terminal according to claim 11, wherein said system unit further determines whether a total amount of electronic money used within a predetermined time interval is equal to or less than a predetermined amount of electronic money when said secret data is received from said storage device within the predetermined time period after said control signal is outputted from said system unit to said storage device, and carries out said predetermined process when it is determined that the total amount of electronic money used within the predetermined time interval is equal to or less than the predetermined amount of electronic money.

14. The portable terminal according to claim 13, wherein said system unit stops said predetermined process when it is determined that the total amount of electronic money used within the predetermined time interval is larger than the predetermined amount of electronic money.

15. The portable terminal according to claim 11, wherein said switch section includes at least a button.

16. A portable terminal comprising:
a detachable storage device which stores secret data;
a system unit which outputs a control signal to said storage device, and receives said secret data relating to said control signal from said storage device to carry out a predetermined process associated with said secret data;
a switch section which generates a valid signal in response to operation of said switch section by a user; and
a control circuit which operates to permit transfer of said control signal from said system unit to said storage device in response to said valid signal such that the transfer of said secret data from said storage device to said system unit is permitted,
wherein said switch section generates an invalid signal when said switch section is not operated, and said control circuit operates to inhibit the transfer of said control signal in response to said invalid signal such that the transfer of said secret data is inhibited.

17. The portable terminal according to claim 16, wherein said system unit stops said predetermined process when said secret data cannot be received from said storage device within a predetermined time period after said control signal is outputted from said system unit to said storage device.

18. The portable terminal according to claim 17, wherein said system unit carries out said predetermined process when said secret data is received from said storage device within the predetermined time period after said control signal is outputted from said system unit to said storage device.

19. The portable terminal according to claim 16, wherein said system unit determines whether a total amount of electronic money used within a predetermined time interval is equal to or less than a predetermined amount of electronic money when said secret data is received from said storage device within the predetermined time period after said control signal is outputted from said system unit to said storage device, and carries out said predetermined process when it is determined that the total amount of electronic money used within the predetermined time interval is equal to or less than the predetermined amount of electronic money.

20. The portable terminal according to claim 19, wherein said system unit stops said predetermined process when it is determined that the total amount of electronic money used within the predetermined time interval is larger than the predetermined amount of electronic money.

21. The portable terminal according to claim 1, wherein access of said storage device by said system unit is only allowed when a user validates transfer of said control signal by operating a switch in said control section.

22. The portable terminal according to claim 11, wherein access of said storage device by said system unit is only allowed when a user validates transfer of said control signal by operating a switch in said control section.

23. The portable terminal according to claim 16, wherein access of said storage device by said system unit is only allowed when a user permits transfer of said control signal by operating said switch section to generate said valid signal.

24. The portable terminal according to claim 1, wherein said validation of transfer of said control signal includes a generation of a signal which permits transfer of said control signal.

25. The portable terminal according to claim 11, wherein said validation of transfer of said control signal includes a generation of a signal which permits transfer of said control signal.

26. The portable terminal according to claim 16, wherein said validation of transfer of said control signal includes a generation of a signal which permits transfer of said control signal.

* * * * *